(12) United States Patent
Eichholz et al.

(10) Patent No.: US 8,966,275 B2
(45) Date of Patent: Feb. 24, 2015

(54) METHOD FOR AUTHENTICATING A PORTABLE DATA CARRIER

(75) Inventors: Jan Eichholz, Munich (DE); Gisela Meister, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 138 days.

(21) Appl. No.: 13/582,107

(22) PCT Filed: Mar. 7, 2011

(86) PCT No.: PCT/EP2011/001107
§ 371 (c)(1),
(2), (4) Date: Aug. 31, 2012

(87) PCT Pub. No.: WO2011/110318
PCT Pub. Date: Sep. 15, 2011

(65) Prior Publication Data
US 2012/0331302 A1    Dec. 27, 2012

(30) Foreign Application Priority Data

Mar. 10, 2010   (DE) .......................... 10 2010 010 950

(51) Int. Cl.
*G06F 21/00* (2013.01)
*G06F 21/34* (2013.01)

(52) U.S. Cl.
CPC ........ *G06F 21/34* (2013.01); *G06F 2221/2103* (2013.01)
USPC ........................................................ 713/182

(58) Field of Classification Search
None
See application file for complete search history.

(56) References Cited

U.S. PATENT DOCUMENTS 5,721,781 A * 2/1998 Deo et al. .......................... 705/67
5,818,738 A * 10/1998 Effing ............................ 702/117

(Continued)

FOREIGN PATENT DOCUMENTS

| CN | 1467947 A | 1/2004 |
| CN | 1767429 A | 5/2006 |
| WO | 2006089101 A2 | 8/2006 |

OTHER PUBLICATIONS

Shinsaku Kiyomoto and Toshiaki Tanaka, "Anonymous Attribute Authentication Scheme Using Self-Blindable Certificates", Jun. 17, 2008, pp. 215-217.*

(Continued)

*Primary Examiner* — Jeffrey Pwu
*Assistant Examiner* — Wasika Nipa
(74) *Attorney, Agent, or Firm* — Workman Nydegger

(57) ABSTRACT

A method for authenticating a portable data carrier (10) to a terminal device by the following steps: In the data carrier (10) a public session key ($PK_{Session}$) is derived (S5) from a public key individual to the data carrier ($PK_i$) which has in its turn been derived (TS32; S1) from a public group key (PK). Further, a secret session key ($SK_{Session}$) is derived (S4) from a secret key individual to the data carrier ($SK_i$) which has in turn been derived (TS31) from a secret group key (SK). Subsequently, a secret communication key (KK) is agreed on (S7) between the data carrier (10) and the terminal device. Finally, the terminal verifies (S8) the public session key ($PK_{Session}$) of the data carrier (10).

16 Claims, 3 Drawing Sheets

(56) References Cited

U.S. PATENT DOCUMENTS

| | | | | |
|---|---|---|---|---|
| 5,867,577 | A | * | 2/1999 | Patarin .......................... 705/67 |
| 6,336,188 | B2 | * | 1/2002 | Blake-Wilson et al. ...... 713/171 |
| 7,010,684 | B2 | * | 3/2006 | DeTreville .................... 713/159 |
| 7,590,846 | B2 | * | 9/2009 | Girault .......................... 713/172 |
| 2003/0228886 | A1 | * | 12/2003 | Ishii et al. .................... 455/558 |
| 2004/0025021 | A1 | * | 2/2004 | Aikawa et al. ............... 713/172 |
| 2004/0030896 | A1 | * | 2/2004 | Sakamura et al. ............ 713/169 |
| 2007/0083766 | A1 | * | 4/2007 | Farnham et al. .............. 713/176 |
| 2009/0271876 | A1 | * | 10/2009 | Takagi .......................... 726/30 |
| 2009/0307491 | A1 | * | 12/2009 | Nakatsugawa et al. ....... 713/169 |

OTHER PUBLICATIONS

Youngdae Kim and Adrian Perrig and Gene Tsudik, "Simple and Fault-Tolerant Key agreement for Dynamic Collaborative Groups", 2000, pp. 235-244.* http://en.wikipedia.org/wiki/Diffie%E2%80%93Hellman_key_exchange, Nov. 2009, 11 pages.*

International Preliminary Report on Patentability issued in PCT/EP2011/001107, dated Sep. 25, 2012.

Zhiguo Wan, "Anonymous ID-based Group Key Agreement for Wireless Networks", Proceedings of the IEEE Wireless Communications and Networking Conference, 2008, pp. 2615-2620.

Shouhuai Xu, et al, "Accountable Ring Signatures: A Smart Card Approach", Smart Card Research and Advanced Applications VI, IFIP International Federation for Information Processing, 2004, vol. 153/2004. pp. 272-286.

Kiyomoto, S, et al., "Anonymous Attribute Authentication Scheme Using Self-Blindable Certificates", Intelligence and Security Informatics, Jun. 17, 2008, IEEE International Conference on, IEEE, Piscataway, NJ, US, pp. 215-217, XP031286471, ISBN: 978-1-4244-2414-6.

Menezes, AJ, et al., "Handbook of applied cryptography", Chapter 13: Key Management Techniques ED, Oct. 1, 1996, CRC press series on descrete mathematices and its applications, CRC press, Boca Raton, FL, US, pp. 543-590, XP001525013, ISBN: 978-0-8493-8523-0.

Menezes, AJ, et al., "Handbook of applied cryptography", Chapter 12: Key Establishment Techniques ED, Oct. 1, 1996, CRC press series on descrete mathematices and its applications, CRC press, Boca Raton, FL, US, pp. 489-541, XP001525012, ISBN: 978-0-8493-8523-0.

International Search Report for PCT/EP2011/001107, May 11, 2011.

Chinese Search Report from CN Application No. 201180013064.X, Jul. 1, 2014.

* cited by examiner

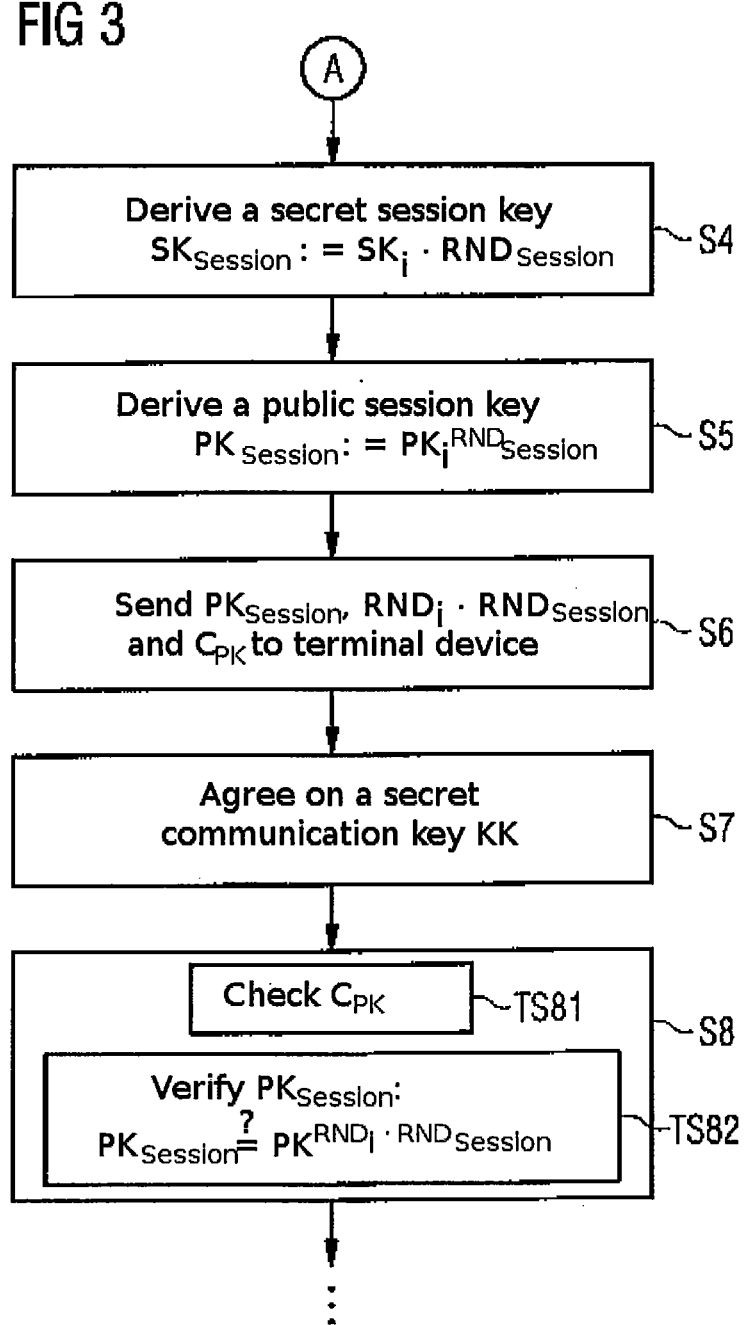

METHOD FOR AUTHENTICATING A PORTABLE DATA CARRIER

BACKGROUND OF THE INVENTION

A. Field of the Invention

The present invention relates to a method for authenticating a portable data carrier to a terminal device, as well as an accordingly adapted data carrier and a terminal device.

B. Related Art

A portable data carrier, for example in the form of an electronic identity document, comprises an integrated circuit having a processor and a memory. In the memory there are stored data that relate to a user of the data carrier. On the processor there is executable an authentication application via which the data carrier can authenticate itself to a terminal device, for example at a border control or the like in the case of an identity document.

During such an authentication method, a secure data communication between the data carrier and the terminal device is prepared by a secret communication key for symmetric encryption of a subsequent data communication being agreed on, for example by means of the known key exchange method according to Diffie and Hellman or other suitable methods. Further, at least the terminal normally verifies the authenticity of the data carrier, for example on the basis of a certificate.

For carrying out a method for agreeing on the secret communication key, it is necessary that the terminal as well as the data carrier respectively make available a secret key and a public key. The certificate of the data carrier can relate for example to its public key.

When each data carrier of a set or group of data carriers having an individual key pair consisting of a public key and a secret key is personalized, there result problems with regard to the anonymity of the user of the data carrier. It would then be possible to associate each use of the data carrier uniquely with the corresponding user and in this way create for example a complete movement profile of the user. To take account of this aspect, it has been proposed to equip a plurality or group of data carriers respectively with an identical, so-called group key pair consisting of a public group key and a secret group key. This makes it possible to restore the anonymity of a user, at least within the group. This solution is disadvantageous in that if one of the data carriers of the group is compromised, the total group of data carriers must be replaced. If the secret group key of one of the data carriers of the group has been spied out, for example, none of the data carriers of the group can be securely used further. The effort and costs of a necessary replacement campaign can be huge.

SUMMARY OF THE DISCLOSURE

The object of the present invention is to propose an authentication method that protects the anonymity of the user and wherein the compromising of one of the data carriers has no adverse effects on the security of other data carriers.

A method according to the invention for authenticating a portable data carrier to a terminal device comprises the following steps: In the data carrier a public session key is derived from a public key individual to the data carrier. This public key individual to the data carrier has in its turn been derived from a public group key. Further, in the data carrier a secret session key is derived from a secret key individual to the data carrier, which has in its turn been derived from a secret group key. The public key individual to the data carrier and the secret key individual to the data carrier are stored in the data carrier, but not the secret group key and the public group key.

Within the framework of the authentication of the data carrier to the terminal device, the public and the secret session keys are used. The data carrier will use its secret session key. The public session key is made available by the data carrier for the terminal device, which uses it within the framework of the authentication of the data carrier.

In particular, a secret communication key can be agreed on between the data carrier and the terminal device. The data carrier has for this purpose the public and the secret session keys. The terminal device in turn has for this purpose a public terminal key and a secret terminal key. Finally, the terminal device verifies the public session key of the data carrier.

A portable data carrier according to the invention therefore comprises a processor, a memory and a data communication interface for data communication with a terminal device, as well as an authentication device. The latter is adapted to derive a secret session key from a secret key individual to the data carrier that is stored in the memory. The authentication device is further adapted to derive a public session key from a public key individual to the data carrier that is stored in the memory. Further, it can agree on a secret communication key with the terminal device. For this purpose, the authentication device uses the public session key and the secret session key.

A terminal device according to the invention, finally, is adapted for data communication with a portable data carrier according to the invention, as well as for agreeing on a secret communication key with the data carrier while using a public terminal key and a secret terminal key. The terminal device is further adapted to verify a public session key of the data carrier, which has been derived from a public group key via a public key individual to the data carrier.

In the method according to the invention it is no longer necessary to store the secret group key in the data carrier. Therefore, such key cannot be spied out upon an attack on the data carrier. Secret session keys of other, non-attacked data carriers of a group of data carriers can be used further. It is not possible to track the user of the data carrier on the basis of the secret session key of the data carrier, which might be employed in a challenge-response method for authentication to the terminal device, because this session key changes from one use to the next.

Preferably, the terminal device verifies the public session key of the data carrier by means of a certificate of the public group key, which certificate is stored on the data carrier. For this purpose, the terminal device first checks the certificate. Thereafter the terminal device reconstructs the derivation of the public session key from the public group key via the public key individual to the data carrier. The derivation information necessary therefor is made available by the data carrier. In this way the data carrier can be authenticated as a data carrier of the group associated with the group key pair, but not be tracked on the basis of a certificate individual to the data carrier, which certificate is not provided according to the invention. Only the certificate of the public group key, said certificate being identical for all data carriers of the group, is stored on the data carrier, thereby preserving the anonymity of the user of the data carrier.

According to a preferred embodiment, the public key individual to the data carrier and the secret key individual to the data carrier are derived from the public group key and the secret group key and stored in the data carrier in a personalization phase of the data carrier. The certificate of the public group key can likewise be incorporated into the data carrier and stored in this phase.

Preferably, the secret key individual to the data carrier is derived from the secret group key by using a first random number. For this purpose, there can be used any suitable operation that can take up as input data—inter alia—the secret group key as well as the first random number (and) process them into the secret key individual to the data carrier. For example, there can be used mathematical operations, such as multiplication, exponentiation or the like. The public key individual to the data carrier can then be derived by means of the previously derived secret key individual to the data carrier. This is expedient e.g. when the public group key has also been formed using the secret group key, for example by means of modular exponentiation, as known from the Diffie-Hellman key exchange method. It is also possible to derive the public key individual to the data carrier from the public group key in a different way.

In a similar way the derivation of the secret session key from the secret key individual to the data carrier and of the public session key from the public key individual to the data carrier is also effected in randomized fashion, i.e. in dependence on a second random number. Here, too, there can be used different derivation operations which permit as input data at least respectively the respective key individual to the data carrier and the second random number. Normally, the derivation of the secret session key differs from the derivation of the public session key. However, the same second random number is usually used for the derivation of both keys of the session key pair. Since a new session key pair is derived upon each use of the data carrier, i.e. upon each authentication to a terminal device, it is not possible to track the data carrier on the basis of the session keys.

According to a preferred embodiment of the method according to the invention, the secret communication key is agreed on by means of a known Diffie-Hellman key exchange method. This method is based on a specified primitive root modulo a specified prime number. The secret key individual to the data carrier is derived from the secret group key by multiplication by the first random number. The public key individual to the data carrier is computed from an exponentiation of the primitive root by the secret key individual to the data carrier. In so doing, the public group key is formed by exponentiation of the primitive root by the secret group key. The method according to the invention—with session keys preferably varying in randomized fashion—can thus be integrated without any substantial changes into known similar protocols—which provide a key pair firmly bound to the data carrier and use the Diffie-Hellman method.

The secret session key can be formed by multiplication of the secret key individual to the data carrier by the second random number. Then the public session key is derived by exponentiation of the key individual to the data carrier by the second random number. In this way it results that the public session key can be computed by forming an exponentiation of the public group key by the product of the first and second random numbers.

In order for the terminal to be able to verify the public session key of the data carrier, the data carrier sends to the terminal device the public session key, the product of the first and second random numbers as well as the certificate of the public group key.

The terminal device verifies the public session key—after checking the certificate of the public group key—by forming an exponentiation of the public group key by the product of the two random numbers. This computation yields, as described hereinabove, exactly the public session key—as long as the latter has been derived from the public group key via the public key individual to the data carrier in the prescribed fashion. The public session key can thus be verified solely using the public group key. In this way the data carrier is authenticated as belonging to the public group key, while heeding the anonymity of the user of the data carrier and without requiring a certificate individual to the data carrier.

A data carrier is understood here to be for example an electronic identity document, a chip card, a SIM card, a secure MultiMediaCard or a secure USB token. The terminal device can be an arbitrary authentication partner. In particular, it can be a local or a remote terminal, a remote server or another data carrier.

DESCRIPTION OF THE DRAWINGS

As indicated several times hereinabove, the same public and secret group keys are respectively used for deriving secret keys individual to the data carrier and public keys individual to the data carrier of a plurality of different data carriers which form a group of data carriers. It is of course possible to provide several groups of data carriers which are respectively associated with their own group key pair.

Hereinafter the invention will be described by way of example with reference to the attached drawings. Therein are shown.

DETAILED DESCRIPTION

Figure 1:
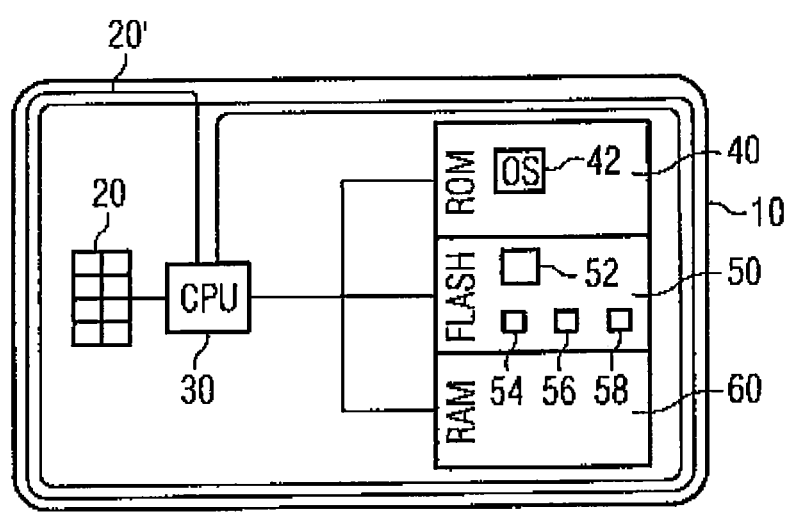
FIG. 1 a preferred embodiment of a data carrier according to the invention in schematic fashion, and FIGS. 2 and 3 steps of a preferred embodiment of the method according to the invention for authenticating the data carrier from FIG. 1 to a terminal device.

Referring to FIG. 1, a data carrier 10, which is represented here as a chip card, comprises data communication interfaces 20, 20', a processor 30 as well as different memories 40, 50 and 60. The data carrier 10 can also be present in a different design.

As data communication interfaces 20, 20' the data carrier 10 comprises a contact pad 20 for contact-type data communication as well as an antenna coil 20' for contactless data communication. Alternative data communication interfaces can be provided. It is further possible that the data carrier 10 supports only one kind of data communication, i.e. only contact-type or contactless.

The non-volatile, non-rewritable ROM memory 40 comprises an operating system (OS) 42 of the data carrier 10, which controls the data carrier 10. At least parts of the operating system 42 can also be stored in the non-volatile, rewritable memory 50. The latter can be present for example as a flash memory.

The memory 50 comprises an authentication device 52 by means of which an authentication of the data carrier 10 to a terminal device can be carried out. In so doing, the keys 54, 56 individual to the data carrier that are likewise stored in the memory, as well as a digital certificate 58, find their application. The mode of operation of the authentication device 52, the keys 54, 56 and the certificate 58 as well as their roles during an authentication process will be described more precisely with reference to FIGS. 2 and 3. The memory 50 can contain further data, for example data relating to its user.

The volatile, rewritable RAM memory 60 serves as the working memory of the data carrier 10.

The data carrier 10 can comprise further features (not shown) when it constitutes for example an electronic identity document. These features can be applied, for example imprinted, visibly on a surface of the data carrier 10 and designate the user of the data carrier, for example through his name or a photo.

Figure 2:
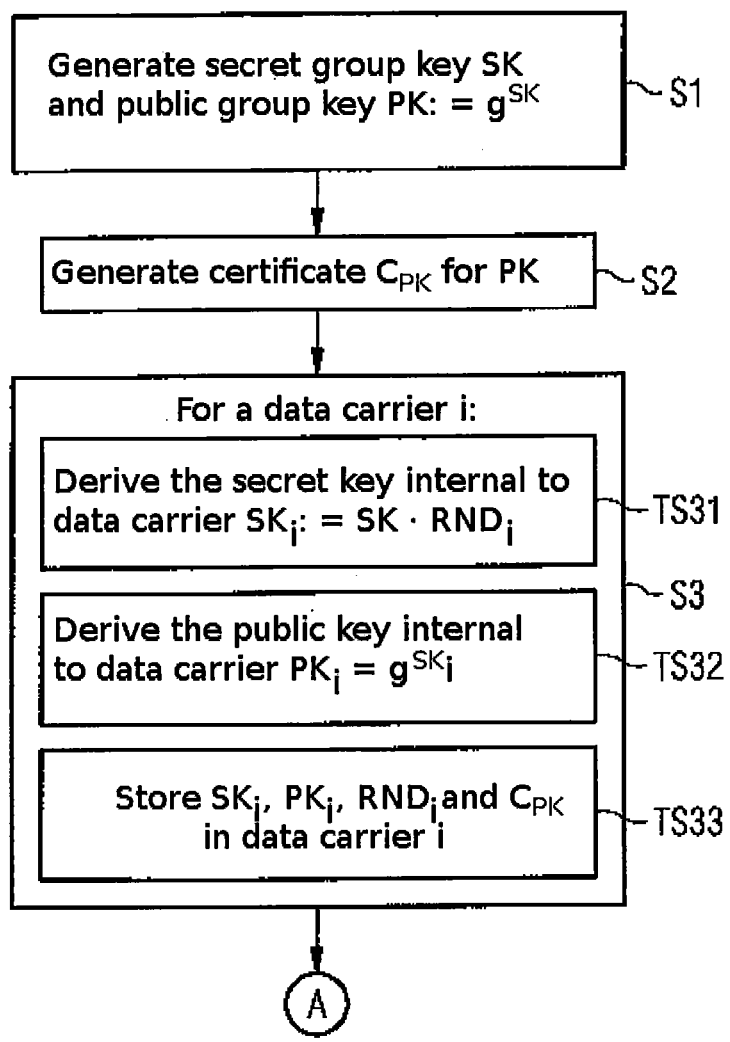

Referring to FIGS. 2 and 3, an embodiment of the method for authenticating the data carrier 10 to a terminal device will now be described more precisely. In FIG. 2 there are shown preparatory steps. These can be carried out for example during the manufacture of the data carrier 10, e.g. in a personalization phase.

In a first step S1 a secret group key SK as well as a public group key PK are formed. The key PK is computed as the result of an exponentiation of a specified primitive root g modulo a specified prime number p. All hereinafter described computations are to be read modulo the prime number p, without this always being explicitly stated. The two keys SK and PK form a group key pair and provide the basis for the hereinafter described key architecture for a group of data carriers 10 of the same kind.

In step S2 there is formed a certificate $C_{PK}$ which is used for verification of the public group key PK.

Step S3 takes place during the personalization of the data carrier 10. In so doing, the data carrier 10, which constitutes a data carrier of a specified group of data carriers, is equipped with a key pair individual to the data carrier $SK_i$, $PK_i$, which is derived from the group key pair SK, PK in randomized fashion, i.e. in dependence on a first random number $RND_i$. In this way, each data carrier 10 of the group is equipped with its own key pair individual to the data carrier which differs from a corresponding key pair of another data carrier of the group, due to the randomized component upon the key derivation. On the other hand, all data carriers 10 of the group are connected by the fact that their key pairs have been derived from the same group key pair SK, PK.

In substep TS31 a secret key $SK_i$ individual to the data carrier is derived by the secret group key SK being multiplied by the random number $RND_i$.

The public key individual to the data carrier $PK_i$ is computed subsequently in substep TS32 as the result of an exponentiation of the hereinabove mentioned primitive root g by the previously formed secret key individual to the data carrier $SK_i$.

The thus derived keys $SK_i$ and $PK_i$ are stored in substep TS33 together with the random number $RND_i$ and the certificate $C_{PK}$ in the data carrier 10. The latter is thus adapted to carry out by means of its authentication device 52 an authentication to a terminal device, as will be described more precisely with reference to FIG. 3.

For preparing a key agreement with the terminal device (cf. step S7), the authentication device 52 derives a secret session key $SK_{Session}$ in step S4. This secret session key $SK_{Session}$ forms a session key pair together with the hereinafter described public session key $PK_{Session}$ (cf. step S5). This key pair is used in the data carrier by the authentication device 52 only in connection with a single authentication to a terminal device, however. For carrying out each future, further authentication a new session key pair is respectively derived from the key pair individual to the data carrier $SK_i$, $PK_i$ by the authentication device 52, in the hereinafter described fashion.

The session key pair is likewise formed using a randomized component. For this purpose, a second random number $RND_{Session}$ is generated or made available by the authentication device 52. The secret session key $SK_{Session}$ is then computed from a multiplication of the secret key individual to the data carrier $SK_i$ by the second random number $RND_{Session}$.

The public session key $PK_{Session}$ derived in step S5 as the result of the exponentiation of the public key individual to the data carrier $PK_i$ by the second random number $RND_{Session}$. In step S6 the authentication device 52 sends to the terminal device the public session key $PK_{Session}$, the value $RND_i * RND_{Session}$ resulting from the multiplication of the first and second random numbers, as well as the certificate $C_{PK}$.

In step S7 a communication key KK is now agreed on between the authentication device 52 of the data carrier 10 and the terminal device. This key serves to encrypt a subsequent data communication between the data carrier 10 and the terminal device by means of a symmetric encryption method. The key agreement can be carried out by known methods, for example the Diffie-Hellman key exchange method.

Finally, the terminal device checks in step S8 the authenticity of the data carrier 10. For this purpose, it checks in a first substep TS81 the certificate $C_{PK}$ of the public group key PK which is known to the terminal. Subsequently, the terminal device verifies the public session key $PK_{Session}$ of the data carrier 10. For this purpose, the terminal device computes the result of the exponentiation of the public group key by the product $RND_i * RND_{Session}$ of the two random numbers and compares this result with the public session key $PK_{Session}$. Through this computation the terminal device reconstructs the derivation of the public session key $PK_{Session}$, starting out from the public group key PK via the public key individual to the data carrier $PK_i$. This holds since $$\begin{aligned}
PK_{Session} &= PK_i{\wedge}(RND_{Session}) & \text{(cf. step }S5) \\
&= (g{\wedge}(SK_i)){\wedge}(RND_{Session}) & \text{(cf. substep }TS32) \\
&= (g{\wedge}(SK * RND_i)){\wedge}(RND_{Session}) & \text{(cf. substep }TS31) \\
&= (g{\wedge}SK){\wedge}(RND_i * RND_{Session}) & \text{(math. reformulation)} \\
&= PK{\wedge}(RND_i * RND_{Session}) & \text{(cf. step }S1).
\end{aligned}$$

If the result matches the public session key $PK_{Session}$, the data carrier 10 is considered verified. In the contrary case the terminal device aborts the authentication process.

The method thus makes it possible that the user of the data carrier 10 can remain anonymous, at least within the group of data carriers that are associated with the same group key pair SK, PK. It is not possible to trace the use of the data carrier 10 back to the user, because session keys $SK_{Session}$, $PK_{Session}$ are used that vary per session, on the one hand, and the verification of the data carrier 10 is effected only by means of the certificate $C_{PK}$ of the public group key PK—which is identical for all data carriers of the group—and not by means of a certificate individual to the data carrier, on the other hand. Further, it is advantageous that one can dispense with storing the secret group key SK in the data carriers 10 of the group.

Within the framework of the present solution, a multiplication can be an arbitrary group-specific multiplication, and an exponentiation an arbitrary group-specific exponentiation. Multiplication and exponentiation can be carried out on the basis of the discrete logarithm or on the basis of elliptical curves. Moreover, a modified derivation can be used upon the derivation for example of the individual key $SK_i = SK * RND_i$ in order to make it more difficult to compute SK. For example, there can be chosen: $SK_i = RND_i{\wedge}SK$.

The invention claimed is:

1. A method for authenticating a portable data carrier to a terminal device, the method comprising:
    deriving a public session key (PKSession) and a secret session key (SKSession) in the data carrier, the public session key (PKSession) being derived from a public key (PKi) individual to the data carrier, the public key (PKi) being derived from a public group key (PK), and the secret session key (SKSession) being derived from a secret key (SKi) individual to the data carrier, the secret key (SKi) being derived from a secret group key (SK); and anonymously authenticating the data carrier to the terminal device using the secret session key (SKSession) in the data carrier and the public session key (PKSession) in the terminal device, wherein the terminal device verifies the public session key (PKSession) by a certificate (CPK) of the public group key (PK), which certificate is stored in the data carrier, by the terminal device checking the certificate (CpK) and reconstructing the derivation of the public session key (PKSession) from the public group key (PK) via the public key (PKi) individual to the data carrier.

2. The method according to claim 1, wherein the terminal device verifies the public session key (PKSession) by the certificate (CPK) of the public group key (PK), which certificate is stored in the data carrier, by the terminal device first checking the certificate (CPK) and thereafter reconstructing the derivation of the public session key (PKSession) from the public group key (PK) via the public key (PKi) individual to the data carrier.

3. The method according to claim 1, wherein the public key (PKi) individual to the data carrier and the secret key (SKi) individual to the data carrier are derived from the public group key (PK) and the secret group key (SK), respectively, and stored in the data carrier in a personalization phase of the data carrier.

4. The method according to claim 1, wherein the secret key (SKi) individual to the data carrier is derived from the secret group key (SK) while using a first random number (RNDi).

5. The method according to claim 1, wherein the public session key and the secret session key (SKSession) are derived from the public key (PKi) individual to the data carrier and the secret key (SKi) individual to the data carrier, respectively, while using a second random number (RNDSession).

6. The method according to claim 1, including the steps of agreeing on a communication key (KK) between the data carrier and the terminal device while using the public session key (PKSession) and the secret session key (SKSession) of the data carrier as well as a public terminal key and a secret terminal key of the terminal device;

wherein the communication key (KK) is agreed on by a Diffie-Hellman key exchange method which is based on a specified primitive root (g) modulo a specified prime number, the secret key (SKi) individual to the data carrier is derived from the secret group key (SK) by multiplication by the first random number (RNDi), and the public key (PKi) individual to the data carrier formed (TS32) by exponentiation of the primitive root (g) by the secret key individual to the data carrier (SKi), wherein the public group key (PK) is formed by exponentiation of the primitive root (g) by the secret group key (SK).

7. The method according to claim 1, wherein the secret session key (SKSession) is derived by multiplication of the secret key (SKi) individual to the data carrier by the second random number (RNDSession) and the public session key (PKSession) is derived by exponentiation of the public key (PKi) individual to the data carrier by the second random number (RNDSession).

8. The method according to claim 1, wherein the data carrier sends to the terminal device the public session key (PKSession) the product (RNDi*RNDSession) of the first random number (RNDi) and the second random number (RNDSession) as well as the certificate (CPK) of the public group key (PK).

9. The method according to claim 1, wherein the terminal device, for verifying the public session key (PKSession) forms an exponentiation of the public group key (PK) by the product (RNDi*RNDSession) of the first random number (RNDi) and the second random number (RNDSession).

10. The method according to claim 1, wherein, for deriving public keys (PKi) individual to the data carrier and secret keys (SKi) individual to the data carrier of a plurality of different data carriers, the same public and secret group keys (PK; SK) are respectively used.

11. A portable data carrier, comprising: a processor, a memory, a data communication interface, and an authentication device, wherein the data communication interface is configured to provide data communication with a terminal device, and wherein the authentication device is configured to derive a public session key (PKSession) from a public key (PKi) individual to the data carrier that is stored in the memory, the public key (PKi) being derived from a public group key (PK), derive a secret session key (PKSession) from a secret key (SKi) individual to the data carrier that is stored in the memory, the secret key (SKi) being derived from a secret group key (SK), and anonymously authenticate the data carrier to the terminal device using the secret session key (SKSession) within the framework of an authentication to the terminal device, and wherein the data carrier stores a certificate (CPK) of the public group key (PK), the certificate (CPK) of the public group key (PK) being configured to be used by the terminal device in the authentication of the portable data carrier for verifying the public session key (PKSession), by checking the certificate (CPK) and reconstructing the derivation of the public session key (PKSession) from the public group key (PK) via the public key (PKi) individual to the data carrier.

12. The data carrier according to claim 11, wherein the data carrier is configured to authenticate itself to a terminal device by:

deriving a public session key (PKSession) and a secret session key (SKSession) in the data carrier, the public session key (PKSession) being derived from a public key (PKi) individual to the data carrier, the public key (PKi) being derived from a public group key (PK), and the secret session key (SKSession) being derived from a secret key (SKi) individual to the data carrier, the secret key (SKi) being derived from a secret group key (SK); and anonymously authenticating the data carrier to the terminal device using the secret session key (SKSession) in the data carrier or the public session key (PKSession) in the terminal device.

13. A terminal device for data communication with the portable data carrier recited in claim 11, wherein the terminal device is arranged, using a public terminal key and a secret terminal key, to agree on a communication key (KK) with the portable data carrier and to verify a public session key (PKSession) of the data carrier which has been derived from a public group key (PK) via a public key (PK) individual to the data carrier.

14. The terminal device according to claim 13, wherein the terminal device is arranged to verify the public session key (PKSession) of the data carrier by the certificate (CPK) of the public group key (PK), said certificate being stored in the data carrier, by the terminal device first checking the certificate (CPK) and thereafter reconstructing the derivation of the public session key (PKSession) from the public group key (PK) via the public key (PKi) individual to the data carrier.

15. A system comprising the portable data carrier recited in claim 12 and a terminal device for data communication with the portable data carrier,
   wherein the terminal device is arranged, using a public terminal key and a secret terminal key, to agree on a communication key (KK) with the portable data carrier and to verify a public session key (PKSession) of the data carrier which has been derived from a public group key (PK) via a public key (PK) individual to the data carrier.

16. The method according to claim 1, wherein the data carrier stores the certificate (CPK) of the public group key (PK), the certificate (CPK) of the public group key (PK) being configured to be used by the terminal device in the authentication of the portable data carrier.

* * * * *